US012316035B2

(12) United States Patent
Rodriguez-Garcia et al.

(10) Patent No.: US 12,316,035 B2
(45) Date of Patent: May 27, 2025

(54) COINCIDENT PHASE CENTER, MICROSTRIP FED, PLANAR ULTRAWIDEBAND MODULAR ANTENNA

(71) Applicant: L3Harris Technologies, Inc., Melbourne, FL (US)

(72) Inventors: Pedro Rodriguez-Garcia, Heath, TX (US); Joshua Martin, Rockwall, TX (US); Robert George, Caddo Mills, TX (US)

(73) Assignee: L3Harris Technologies, Inc., Melbourne, FL (US)

( * ) Notice: Subject to any disclaimer, the term of this patent is extended or adjusted under 35 U.S.C. 154(b) by 161 days.

(21) Appl. No.: 18/458,204

(22) Filed: Aug. 30, 2023

(65) Prior Publication Data

US 2025/0079712 A1 Mar. 6, 2025

(51) Int. Cl.
*H01Q 1/22* (2006.01)
*H01Q 9/04* (2006.01)
*H01Q 21/06* (2006.01)

(52) U.S. Cl.
CPC ............... *H01Q 9/045* (2013.01); *H01Q 1/22* (2013.01); *H01Q 21/065* (2013.01)

(58) Field of Classification Search
CPC .. H01Q 1/22; H01Q 1/26; H01Q 1/48; H01Q 1/246; H01Q 1/523; H01Q 5/42; H01Q 9/28; H01Q 9/045; H01Q 21/062; H01Q 21/065
See application file for complete search history.

(56) References Cited

U.S. PATENT DOCUMENTS

| | | | |
|---|---|---|---|
| 8,325,093 | B2 | 12/2012 | Holland et al. |
| 8,487,400 | B2 | 7/2013 | Lin |
| 9,437,929 | B2 | 9/2016 | Isom et al. |
| 10,741,914 | B2 | 8/2020 | Vouvakis et al. |
| 10,763,016 | B2 | 9/2020 | Tamagawa et al. |

(Continued)

OTHER PUBLICATIONS

Christopher S. Merola, et al., "UHF Planar Ultra-Wideband Modular Antenna (PUMA) Arrays," 2017 IEEE International Symposium on Antennas and Propagation & USNC/URSI National Radio Science Meeting, San Diego, CA, USA, 2017, 2 pages.

(Continued)

*Primary Examiner* — Tung X Le
(74) *Attorney, Agent, or Firm* — Edell, Shapiro & Finnan, LLC

(57) ABSTRACT

An antenna module comprises: stacked printed circuit boards (PCBs) (stacked PCBs) centered on an axis and including: a first PCB having a ground plane; a second PCB, spaced above the first PCB, having a first radiator pair and a second radiator pair that face the ground plane and orthogonally crisscross each other at the axis, each radiator pair having respective signal and ground connection pads adjacent to the axis to form a coincident phase center at the axis for each radiator pair; a third PCB, spaced above the second PCB, for impedance matching; and signal connectors extending through the first PCB; and support PCBs extending from the ground plane to the second PCB, the support PCBs having microstrip feeds to connect the respective signal and ground connection pads of the first radiator pair and the second radiator pair to the signal connectors and to the ground plane.

20 Claims, 11 Drawing Sheets

(56) References Cited

U.S. PATENT DOCUMENTS

| | | | | |
|---|---|---|---|---|
| 10,978,813 | B2 * | 4/2021 | Yang | H01Q 25/001 |
| 11,777,229 | B2 * | 10/2023 | Li | H01Q 9/285<br>343/797 |
| 12,230,891 | B2 * | 2/2025 | Tang | H01Q 3/36 |
| 2006/0273865 | A1 * | 12/2006 | Timofeev | H01Q 3/36<br>333/161 |
| 2012/0112967 | A1 * | 5/2012 | Coupez | H01Q 21/062<br>343/700 MS |
| 2019/0356058 | A1 | 11/2019 | Martin et al. | |
| 2020/0321708 | A1 | 10/2020 | Shi et al. | |
| 2021/0257746 | A1 | 8/2021 | Isom et al. | |
| 2022/0352649 | A1 * | 11/2022 | Wu | H01Q 9/26 |

OTHER PUBLICATIONS

Justin A. Kasemodel, et al., "Dual Polarized Ultrawideband Coincident Phase Center TCDA with 15:1 Bandwidth," 2019 IEEE International Symposium on Phased Array System & Technology (PAST), Waltham, MA, USA, 2019, 5 pages.

Yongwei Zhang, et al., "A Wideband Planar Aperture Array Using Interconnected Crossed Rings," in IEEE Transactions on Antennas and Propagation, vol. 67, No. 2, pp. 945-950, Feb. 2019, 6 pages.

John T. Logan, et al., "A New Class of Planar Ultrawideband Modular Antenna Arrays With Improved Bandwidth", IEEE Transactions on Antennas and Propagation, vol. 66, No. 2, Feb. 2018, 10 pages.

* cited by examiner

COINCIDENT PHASE CENTER, MICROSTRIP FED, PLANAR ULTRAWIDEBAND MODULAR ANTENNA

TECHNICAL FIELD

The present disclosure relates generally to antennas.

BACKGROUND

A conventional antenna module includes one or more printed circuit boards (PCBs) each fabricated with multiple dielectric layers and multiple metallization layers alternated with the multiple dielectric layers. The conventional antenna module generally employs complex mechanical support structures for radiators of the antenna module and a combination of ferrite and dielectric material to achieve wideband frequency performance. The aforementioned combination and diversity of components and materials used in the antenna module significantly complicate the process of fabricating the antenna module, increase the weight of the antenna module, and increase the cost of the antenna module.

DESCRIPTION

Overview

In an embodiment, an antenna module is configured as a dual-polarized, coincident phase center, microstrip fed, planar ultrawideband modular antenna (PUMA) module. The antenna module comprises: stacked printed circuit boards (PCBs) (stacked PCBs) centered on an axis and including: a first PCB having a ground plane; a second PCB, spaced above the first PCB, having a first radiator pair and a second radiator pair that face the ground plane and orthogonally crisscross each other at the axis, each radiator pair having respective signal and ground connection pads adjacent to the axis to form a coincident phase center at the axis for each radiator pair; a third PCB, spaced above the second PCB, for impedance matching; and signal connectors extending through the first PCB; and support PCBs extending from the ground plane to the second PCB, the support PCBs having microstrip feeds to connect the respective signal and ground connection pads of the first radiator pair and the second radiator pair to the signal connectors and to the ground plane.

In another embodiment, an antenna array comprises multiple PUMA modules arranged in a matrix having N rows and M columns of the multiple PUMA modules.

Example Embodiments

Embodiments presented herein are directed to a dual-polarized, coincident phase center, microstrip fed, planar ultrawideband modular antenna (PUMA) element (referred to simply as an "antenna module") configured to operate across L, S, and C telemetry bands (1-6 GHz), for example. The antenna module includes radiating elements (i.e., "radiators") that have connection pads fed with microstrip printed circuit board (PCB) lines (e.g., microstrips) at signal and ground connections of the radiators, without any balun. Due to the coincident phase center, the antenna module is polarization-diverse. The antenna module offers a reduction in size, weight, power, and cost (SWaP-C) and reduces design complexity compared to conventional antennas. Due to the compactness and modularity of the antenna module, the antenna module may form part (i.e., become a component) of a subarray tile configuration, in which each tile represents a fully constructed array from replicas of the antenna module. The form factor of each subarray tile permits placement of the tiles immediately adjacent to each other to form a larger array. The subarray tile placement provides continuous radiating element spacing and pattern integrity, which can be easily reconfigured.

Figure 1:
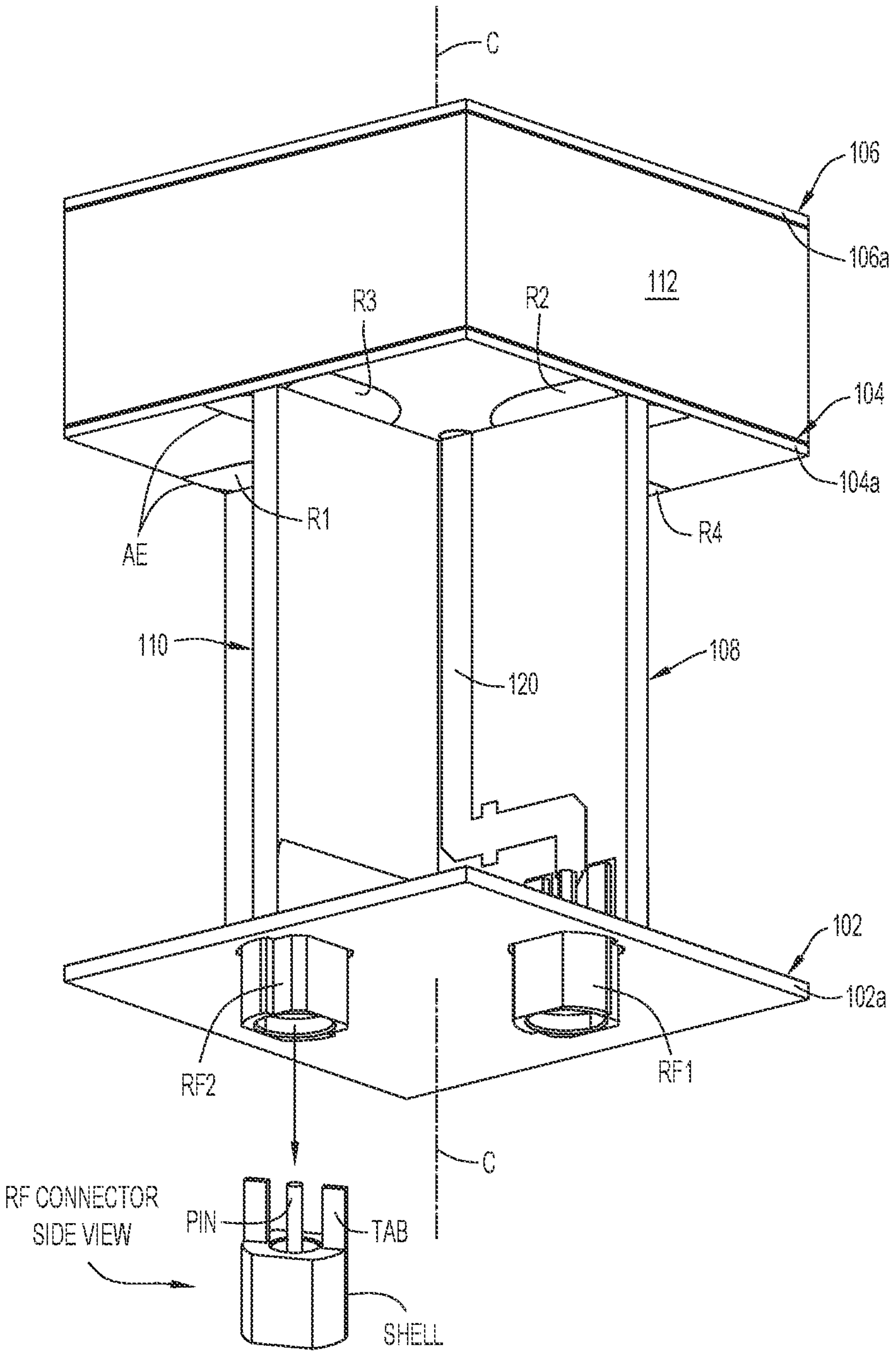
FIG. 1 is a first perspective view of an example antenna module according to an embodiment.
Figure 2:
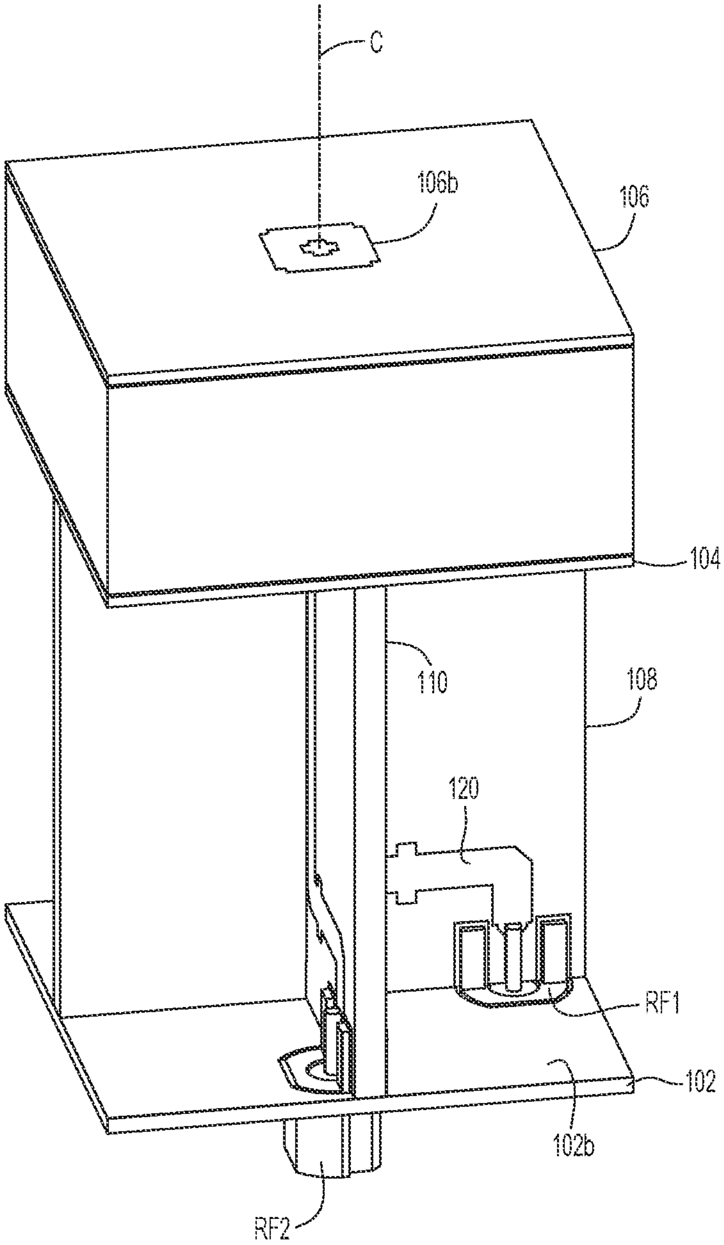
FIG. 2 is a second perspective view of the antenna module.

FIGS. 1 and 2 show different perspective views of an example antenna module 100 according to an embodiment. Antenna module 100 is a compact, lightweight, coincident phase center, microstrip fed, planar ultrawideband modular antenna module. Antenna module 100 may have an operating frequency range from 1-6 GHz for 6:1 bandwidth coverage, although other operating frequencies above and below that range are possible by scaling the size of the antenna module and maintaining the 6:1 bandwidth coverage. Antenna module 100 includes PCBs 102, 104, 106, 108, and 110 that are respectively configured as flat or planar PCBs. Antenna module 100 also includes a foam spacer 112 and RF connectors RF1 and RF2 (also referred to as "signal connectors") integrated with the PCBs. FIG. 1 also shows a side view of RF connector RF2 (which is similar to RF connector RF1). As shown in the side view, the RF connector includes a center signal pin to be soldered to a PCB microstrip, opposing mounting tabs to be fixed to a support PCB, and a ground shell to be connected to a ground plane, as described below.

PCBs 102, 104, and 106 lie in parallel horizontal planes one on top of the other to form a vertical stack of the (planar) PCBs. PCBs 102, 104, and 106 are centered on a vertical center axis C that extends through the vertical stack. PCBs 102, 104, and 106 may have generally rectangular (or square) shapes in their planar dimension. The vertical stack includes PCB 102 forming a bottom or base of the vertical stack to serve as a ground PCB, PCB 104 spaced vertically above PCB 102 to serve as an antenna radiator PCB, and PCB 106 spaced vertically above PCB 104 to serve as a wide-angle impedance matching (WAIM) PCB. PCBs 102, 104, and 106 may be referred to as "vertically-stacked PCBs" or simply "stacked PCBs." PCBs 102, 104, and 106 are each respectively configured as a single-layer (i.e., a one-sided) PCB having a dielectric layer with metallization formed on only one side of the dielectric layer (i.e., only one metallization layer), as described in detail below. Metallization layers and microstrip structures employed in antenna module 100 may comprise copper, for example. Other metals may be used in addition to and/or in place of copper.

Figure 3:
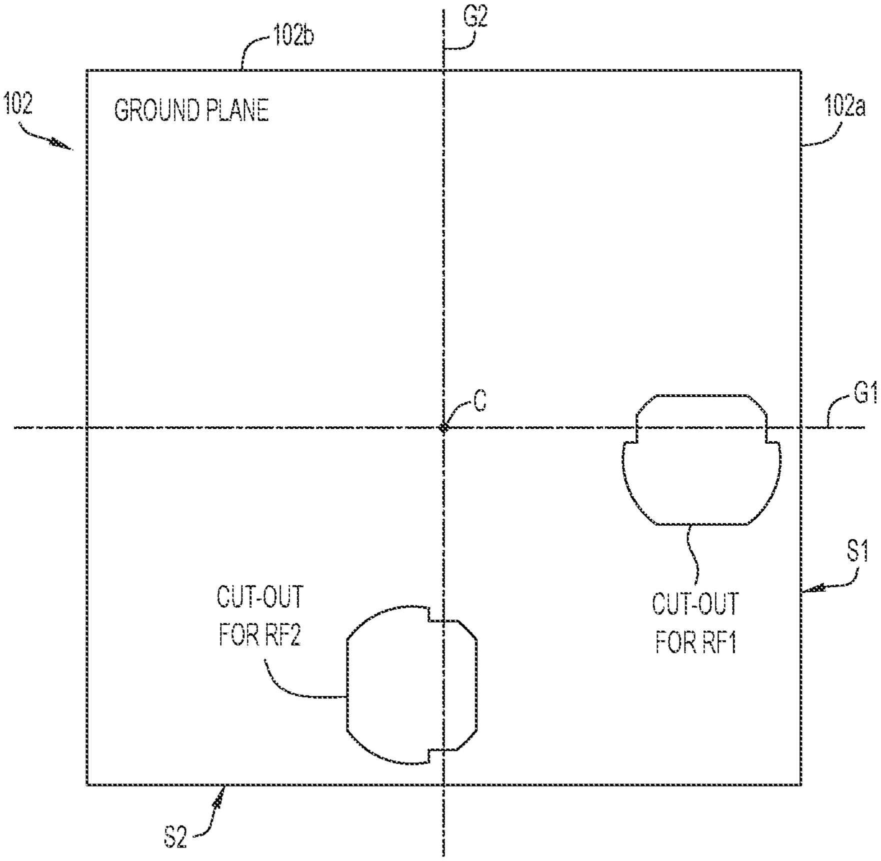
FIG. 3 is a top view of an example ground printed circuit board (PCB) of the antenna module.

PCB 102 has a dielectric layer 102*a* with vertically opposing top and bottom sides. PCB 102 further includes metallization on the top side of dielectric layer 102*a* facing PCB 104 to serve as a ground plane 102*b* (i.e., a ground layer) that is coextensive with the dielectric layer. There is no metallization on the bottom side of dielectric layer 102*a*. RF connectors RF1 and RF2 are mounted to and extend vertically through first PCB 102, so as to be spaced-apart from each other across the PCB. FIG. 3 is a top view of PCB 102 that shows cut-out regions for RF connectors RF1 and RF2. As shown in FIG. 3, and with continued reference to FIGS. 1 and 2, RF connectors RF1, RF2 are positioned adjacent to midpoints of orthogonal sides S1, S2 of PCB 102, respectively. Stated otherwise, RF connectors RF1, RF2 are positioned along orthogonal intersecting axis lines G1, G2 (which divide PCB 102 into quarters) so as to be adjacent to orthogonal sides S1, S2.

Figure 4:
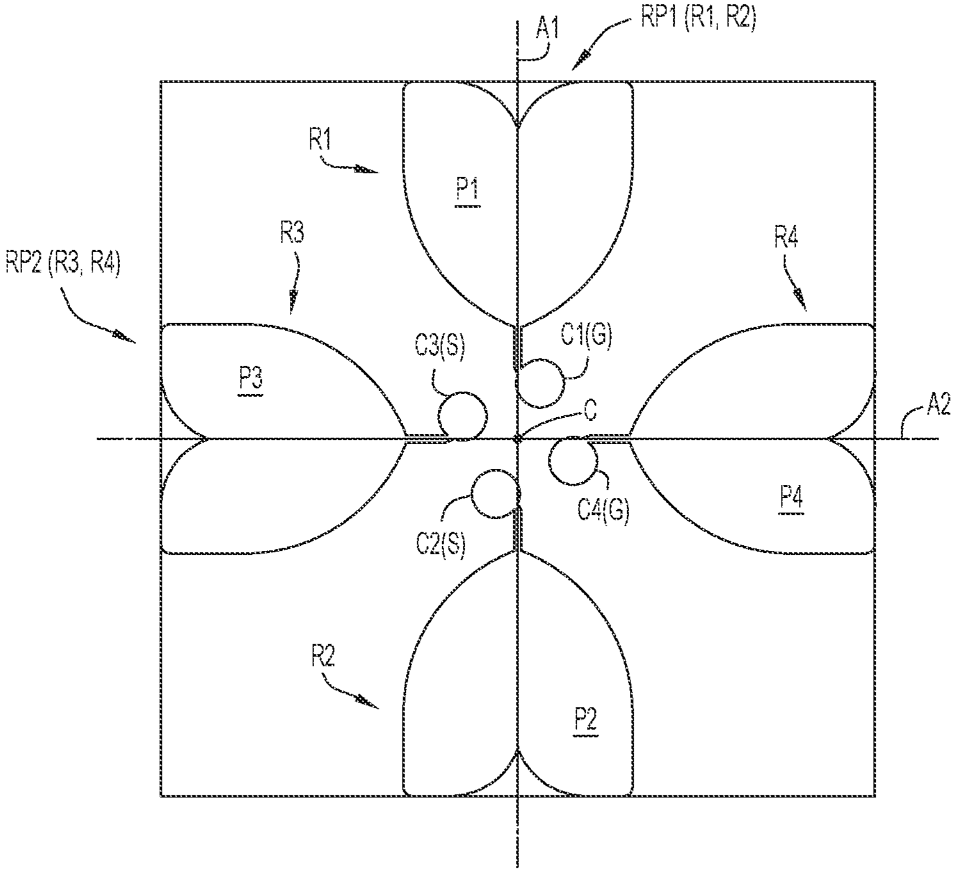
FIG. 4 is a top view of example antenna elements of the antenna module.

As shown in FIG. 1, PCB 104 has a dielectric layer 104*a* with vertically opposing top and bottom sides. PCB 104 includes metallization on the bottom side of dielectric layer 104*a* to form planar antenna elements AE that face ground plane 102*b*. The top side of dielectric layer 104*a* has no metallization. FIG. 4 is a view of antenna elements AE of PCB 104. As shown in FIG. 4, radiating or antenna elements AE include a radiator pair RP1 that lie along an axis line A1 and a radiator pair RP2 that lie along an axis line A2 that is orthogonal to the axis line A1 and that crosses the axis line A1 at center axis C. Radiator pair RP1 and radiator pair RP2 are centered on, and crisscross (i.e., intersect) each other orthogonally at center axis C. Radiator pair RP1 and radiator pair RP2 may also be referred to as a horizontally polarized (H-Pol) radiator pair and a vertically polarized (V-Pol) pair, respectively.

With continued reference to FIG. 4, radiator pair RP1 includes a radiator R1 and a radiator R2 (i.e., a "radiator pair R1, R2"). Radiator R1 and radiator R2 lie along axis line A1 on opposite sides of axis line A2, such that the radiators directly oppose/face each other across the axis line A2. Radiator R1 includes a connection pad C1 immediately adjacent to center axis C and a patch P1 (i.e., a "radiator patch") spaced farther away from the center axis than the connection pad along axis line A1. Radiator R2 includes a connection pad C2 immediately adjacent to center axis C and a patch P2 spaced farther away from the center axis than the connection pad along axis line A1. Connection pads C1 and C2 respectively represent ground (G) (i.e., return) and signal(S) connection pads or feeds of radiator pair RP1. As shown, connection pads C1 and C2 are circular in shape, but they can be any arbitrary shape (i.e., square, triangular). Patches P1, P2 have respective diameters parallel to axis line A2 that increase moving away from center axis C, to give the patches symmetrical shapes about the axis line A1. In addition, patches P1, P2 are symmetrical to each other across axis line A2.

Radiator pair RP2 includes a radiator R3 and a radiator R4 (i.e., a "radiator pair R3, R4"). Radiator R3 and radiator R4 lie along axis line A2 on opposite sides of axis line A1, such that the radiators directly oppose/face each other across the axis line A1. Radiator R3 includes a connection pad C3 immediately adjacent to center axis C and a patch P3 spaced farther away from the center axis than the connection pad along axis line A2. Radiator R4 includes a connection pad C4 immediately adjacent to center axis C and a patch P4 spaced farther away from the center axis than the connection pad along axis line A2. Connection pads C3 and C4 respectively represent RF signal and ground connection pads or feeds of radiator pair RP2. As shown, connection pads C3 and C4 are circular in shape, but they can be any arbitrary shape (i.e., square, triangular). Patches P3, P4 have respective diameters parallel to axis line A1 that increase moving away from center axis C, to give the patches symmetrical shapes about the axis line A2. In addition, patches P3, P4 are symmetrical with each other across axis line A1.

In summary, radiator pairs RP1 (R1, R2) and RP2 (R3, R4) are centered on center axis C, crisscross/intersect each other orthogonally at the center axis, and have their RF signal and ground connection pads (C2, C1) and (C3, C4) immediately adjacent to/collocated with the center axis. Positioning the RF signal and ground connection pads (C2, C1) of radiator pair RP1 adjacent to center axis C, and positioning the RF signal and ground connection pads (C3, C4) of radiator pair RP2 also adjacent to the center axis (i.e., collocating all of the connection pads about the center axis), advantageously forms a coincident phase center for the radiator pairs (and thus for antenna module 100) at the center axis. For example, in an embodiment in which connection pads C2 and C3 are driven by the same RF signal concurrently, radiator pairs RP1 and RP2 generate orthogonally polarized antenna patterns (e.g., horizontally and vertically antenna patterns) that have the coincident phase center at center axis C.

Returning to FIGS. 1 and 2, PCB 106 has a dielectric layer 106*a* with vertically opposing top and bottom sides. The bottom side faces PCB 104 and is free of metallization. PCB 106 includes metallization on the top side of dielectric layer 106*a* to form an impedance matching element 106*b*. Impedance matching element 106*b* represents a parasitic WAIM layer that facilitates impedance matching across antenna scan angles. In the example, impedance matching element 106*b* is formed as a microstrip ring centered on center axis C. Antenna module 100 further includes dielectric foam spacer 112 fixed to and sandwiched between PCBs 104 and 106. For example, foam spacer 112 has a bottom surface and a top surface respectively epoxied to the top side of PCB 104 and the bottom side of PCB 106. Foam spacer 112 comprises a lightweight foam dielectric and has a height that imposes a distance or space between PCBs 104 and 106 that optimizes antenna impedance matching and antenna performance.

Antenna module 100 further includes PCBs 108 and 110 that respectively lie in orthogonal vertical planes (i.e., the PCBs have planar dimensions that extend vertically) and crisscross each other (orthogonally) along center axis C. That is, PCBs 108, 110 lie on their narrow edges such that their planar dimensions extend vertically from ground plane 102*b* to antenna elements AE formed on the bottom side of PCB 104. PCBs 108, 110 are each respectively configured as a two-layer PCB that includes a dielectric layer having horizontally opposing front and back sides that each carry/include metallization (i.e., each of the PCBs includes a respective metallization layer on each of opposing sides of a single dielectric layer).

Figure 5:
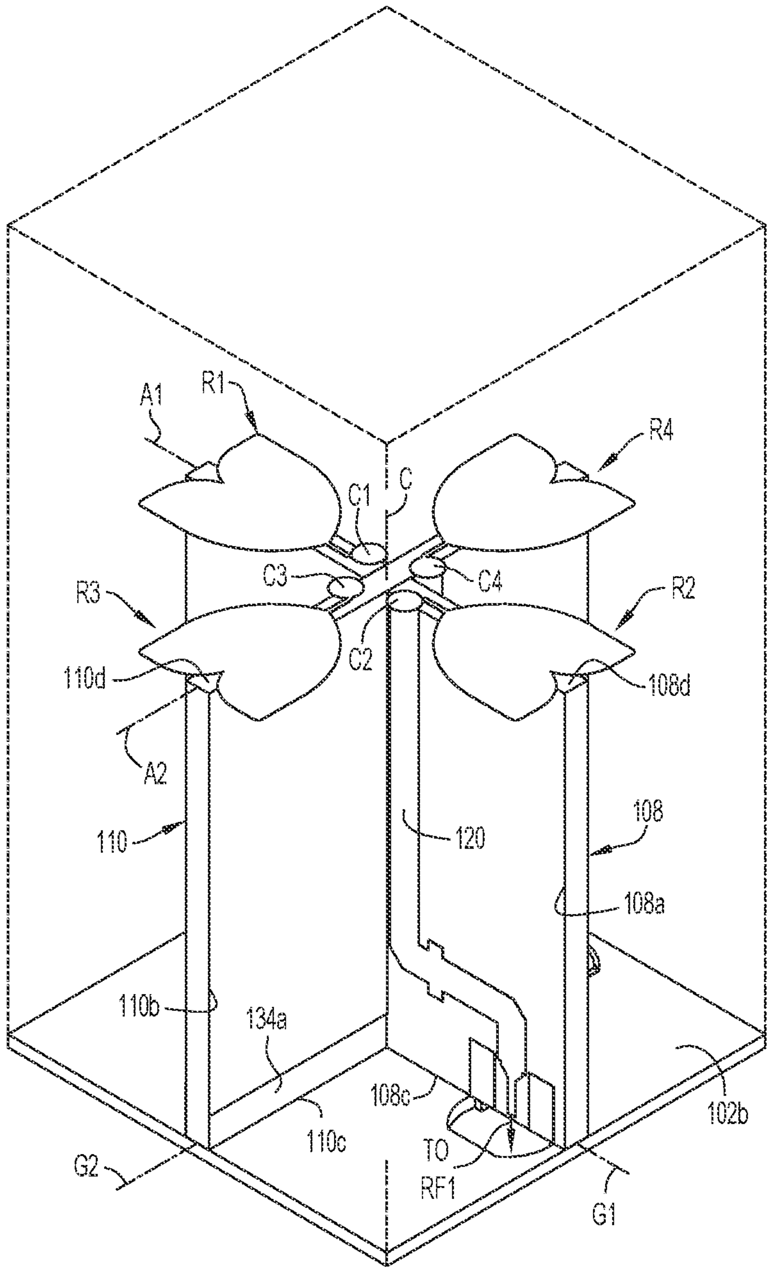
FIG. 5 is a perspective view of the antenna module with certain elements omitted to reveal an example arrangement of support PCBs of the antenna module for the antenna elements.

FIG. 5 is a perspective view of antenna module 100 with dielectric layer 104*a* of PCB 104, foam spacer 112, and PCB 106 omitted to reveal the arrangement of PCBs 108, 110, and antenna elements AE. With reference to FIGS. 1, 2, and 5, PCBs 108, 110 provide structural support to PCB 104, while their two-sided metallization provides RF signal and ground connections/feeds between RF connectors RF1, RF2 and antenna pairs RP1, RP2. That is, the two-sided metallization on PCB 108 provides RF signal and ground connections/feeds (also referred to as "H-Pol feeds") between RF connector RF1 and antenna pair RP1 while the two-sided metallization on PCB 110 provides RF signal and ground connections/feeds (also referred to as "V-Pol feeds") between RF connector RF2 and antenna pair RP2. Accordingly, PCBs 108, 110 may be referred to as "support" and/or "feed" PCBs.

Figure 6B:
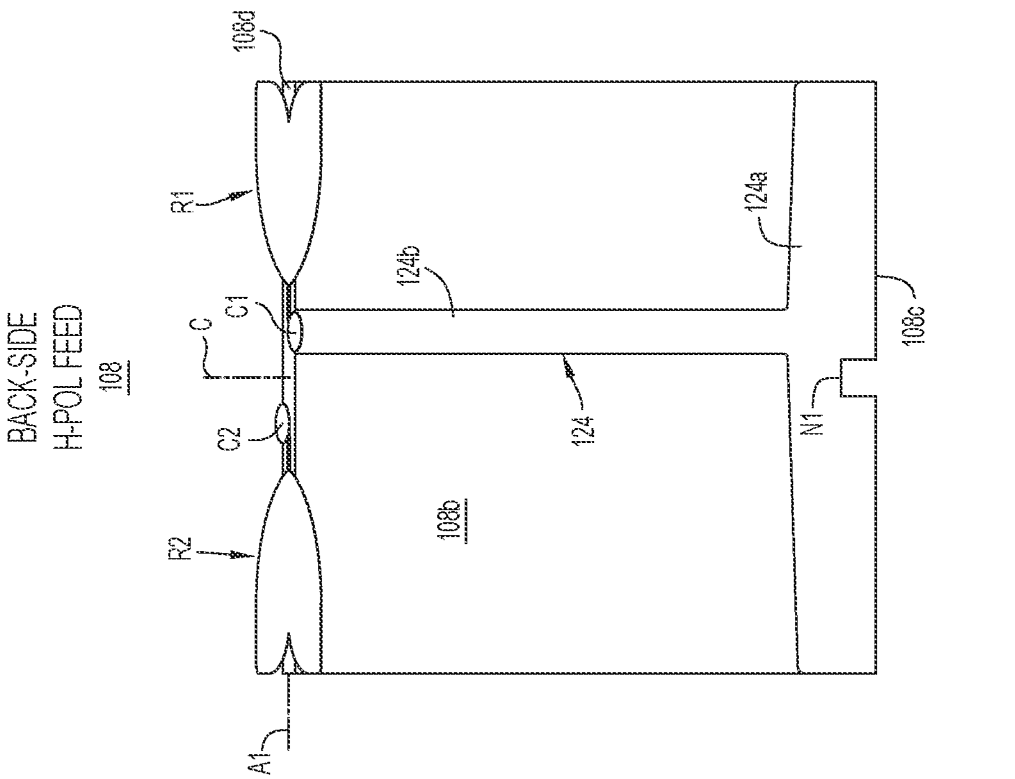
FIG. 6B is a view of a back side of the first support PCB according to an embodiment.
Figure 6A:
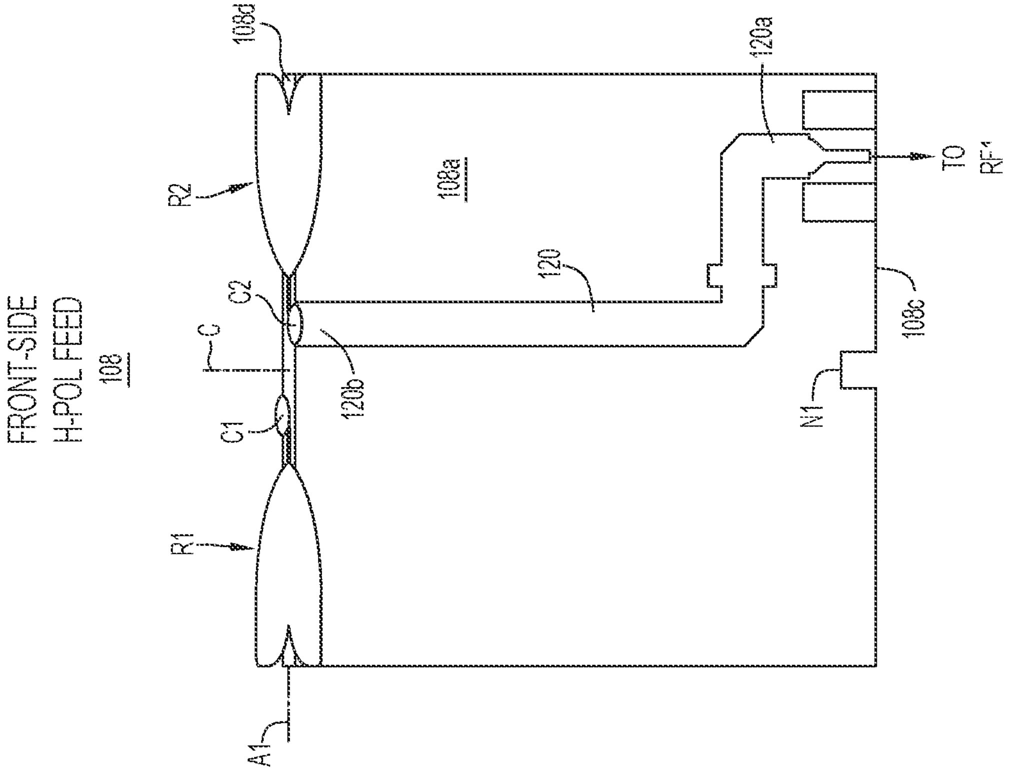
FIG. 6A is a view of a front side of a first support PCB according to an embodiment.

FIGS. 6A and 6B show front and back sides of PCB 108 (also referred to as an "H-Pol feed PCB"). With reference to FIGS. 6A and 6B, and also with continued reference to FIGS. 1, 2, and 5, PCB 108 includes a dielectric layer having a front side 108*a*, a back side 108*b* horizontally opposing the front side, a bottom edge 108*c* that extends adjacently to ground plane 102*b* along axis line G1 (shown in FIG. 3) such that the bottom edge intersects or crosses RF connector RF1, and a top edge 108*d* that extends adjacently to antenna pair RP1 along axis line A1. PCB 108 includes a vertical cut-out or slot N1 at a midpoint of bottom edge 108*c*. Slot N1 is provides a slot structure to interlock PCBs 108 and 110, as described below. Slot N1 extends vertically upward from bottom edge 108*c* a distance D that is substantially less than a full height of PCB 108. For example, distance D may be approximately 10% of the full height PCB 108.

The two-sided metallization of PCB 108 includes a microstrip feed 120 (e.g., an H-Pol feed) formed on front side 108*a* of PCB 108 to connect a center signal pin of RF connector RF1 to connection pad C2 of radiator R2. Microstrip feed 120 has a serpentine shape as shown in FIG. 6A with a bottom-end 120*a* soldered to the center signal pin of RF connector RF1 and a top end 120*b* soldered to connection pad C2. The two-sided metallization of PCB 108 further includes a microstrip feed 124 formed on back side 108*b* of PCB 108 to connect ground plane 102*b* to connection pad C1 of radiator R1. Microstrip feed 124 includes a ground pad 124*a* that extends adjacently to, and is soldered to, ground plane 102*b* along bottom edge 108*c* of PCB 108. Microstrip feed 124 also include a ground leg 124*b* that extends vertically upward from a midpoint of ground pad 124*a* to connection pad C1, and that is soldered to the connection pad.

Figure 7B:
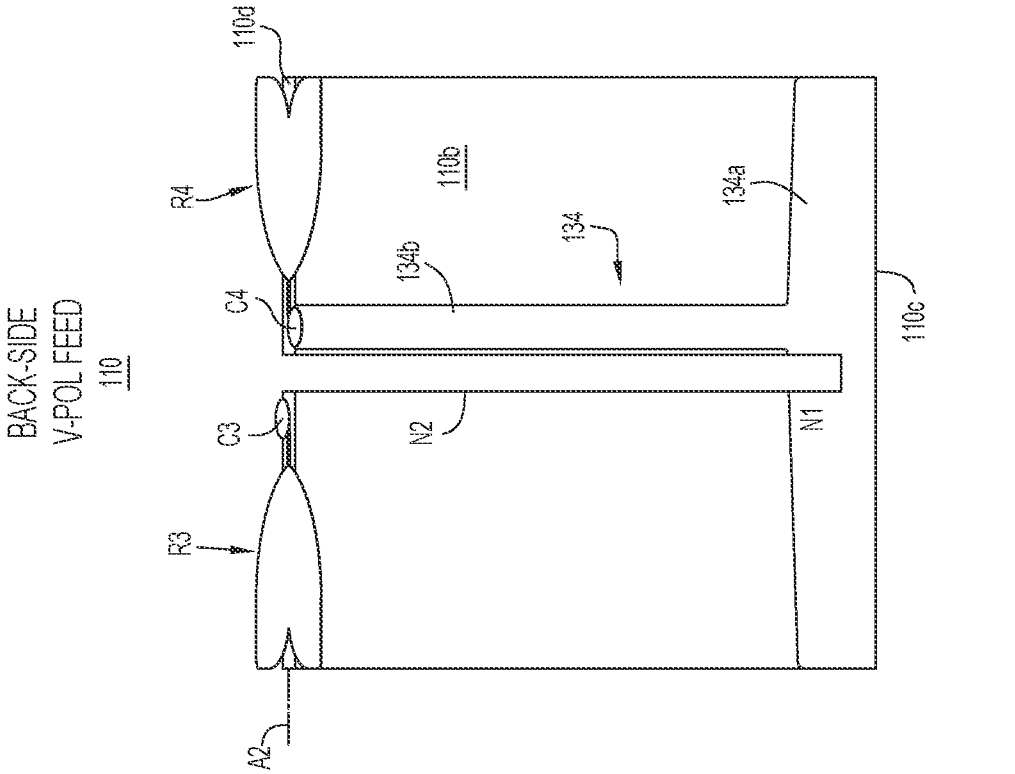
FIG. 7B is a view of a back side of the second support PCB according to an embodiment.
Figure 7A:
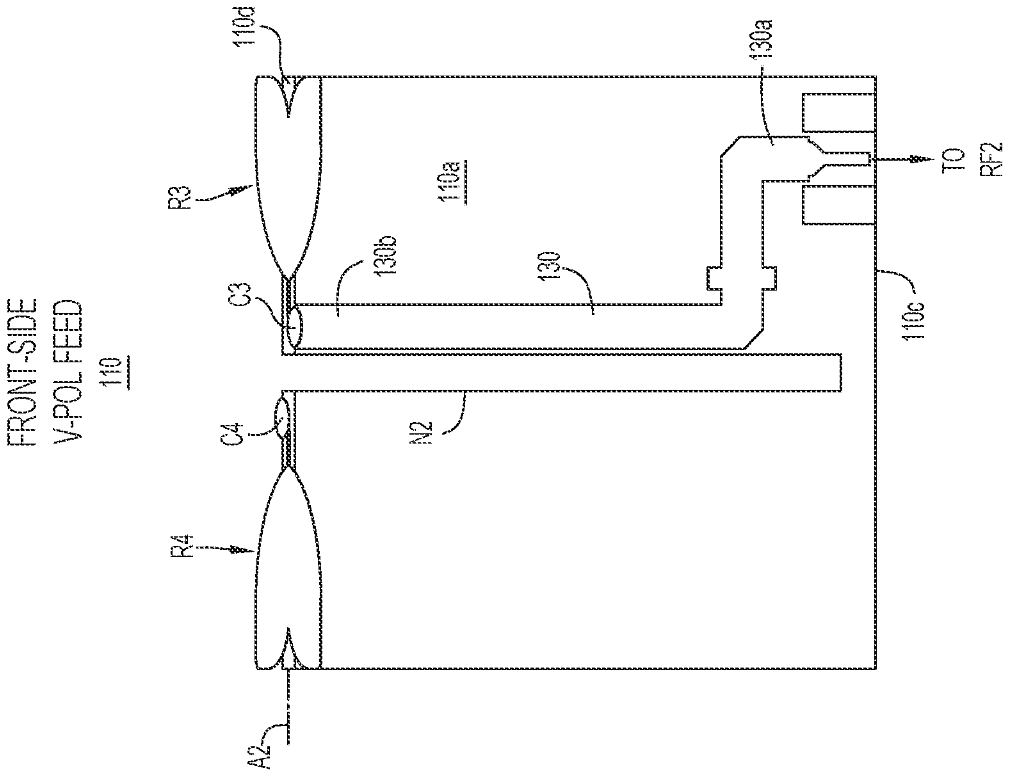
FIG. 7A is a view of a front side of a second support PCB according to an embodiment.

PCB 110 is configured similarly to PCB 108. FIGS. 7A and 7B show front and back sides of PCB 110 (also referred to as a "V-Pol feed PCB"). With reference to FIGS. 7A and 7B, and also with continued reference to FIGS. 1, 2, and 5, PCB 110 includes a dielectric layer having a front side 110*a*, a back side 110*b* horizontally opposing the front side, a bottom edge 110*c* that extends adjacently to ground plane 102*b* along axis line G2 (shown in FIG. 3) such that the bottom edge intersects or crosses RF connector RF2, and a top edge 110*d* that extends adjacently to antenna pair RP2 along axis line A2.

PCB 110 includes a vertical cut-out or slot N2 at a midpoint of top edge 110*d*. Slot N2 provides a slot structure to interlock PCBs 108 and 110. Slot N2 extends vertically downward from top edge 110*d* to distance D from bottom edge 110*c*. That is, slot N2 is complementary to slot N1 of PCB 108. To assemble antenna module 100, PCBs 108 and 110 are positioned orthogonally to each other with PCB 108 above PCB 110 and with slots N1 and N2 aligned vertically. PCB 108 is then slid-down vertically into a rest position mated to PCB 110 such that slots N1 and N2 are interlocked with each other. In this way, slots N1, N2 of PCBs 108, 110 serve as complementary interlocking or intertwined slots for the PCBs.

The two-sided metallization of PCB 110 includes a microstrip feed 130 (also referred to as an "H-Pol feed") formed on front side 110*a* of PCB 110 to connect a center signal pin of RF connector RF2 to connection pad C3 of radiator R3. Microstrip feed 130 has a serpentine shape as shown in FIG. 7A with a bottom-end 130*a* soldered to the center signal pin of RF connector RF2 and a top end 130*b* soldered to connection pad C3. The two-sided metallization of PCB 110 further includes a microstrip feed 134 formed on back side 110*b* of PCB 110 to connect ground plane 102*b* to connection pad C4 of radiator R4. Microstrip feed 134 includes a ground pad 134*a* that extends adjacently to, and is soldered to, ground plane 102*b* along bottom edge 110*c* of PCB 110. Microstrip feed 134 also include a ground leg 134*b* that extends vertically upward from a midpoint of ground pad 134*a* to connection pad C4, and that is soldered to the connection pad.

In the examples described above, the planar dimensions (e.g., side areas) of PCBs 102, 104, and 106 are generally equal and coextensive, and the planar dimensions of PCBs 108 and 110 are also generally equal. As a result, antenna module 100 forms a generally rectangular parallelopiped. In a more specific example, antenna module 100 forms a cube. In an example of a small cubic configuration of antenna module 100, the cube has approximate dimensions of length=1 inch, width=1 inch, and heigh=1 inch, and a weight of approximately 1 ounce.

In summary, antenna module 100 includes:

a. Vertically-stacked horizontal planar PCBs centered on center axis C and including:
   i. First PCB (102) having a ground plane 102*b;*
   ii. Second PCB (104), spaced above the first PCB (102) having a first radiator pair RP1 (R1, R2) and a second radiator pair (R3, R4) that face the ground plane and orthogonally crisscross each other at the center axis, each radiator pair having respective RF signal and ground connection pads ((C2, C1), (C3, C4)) adjacent to the center axis to form a coincident phase center at the center axis for each radiator pair; and
   iii. Third PCB (106), spaced above the second PCB (104), for impedance matching;
b. Dielectric foam spacer (112) sandwiched between the second PCB and the third PCB;
c. RF signal connectors (RF1, RF2) extending through the first PCB; and
d. Support/feed PCBs (108, 110) extending vertically from the ground plane to the second PCB and that crisscross each other along the center axis, the support PCBs having microstrip feeds ((120, 124), (130, 134))

on opposing sides of the support PCBs to connect the respective RF signal and ground connection pads of the first radiator pair and the second radiator pair to the RF signal connectors and to the ground plane. The support PCBs include a first support PCB (108) having first RF signal and ground microstrip feeds (120, 124) to connect the first RF signal and ground connection pads (C2, C1) to the first RF signal connector (RF1) and the ground plane, and a second support PCB (110) having second RF signal and ground microstrip feeds (130, 134) to connect the second RF signal and ground connection pads (C3, C4) to the second signal connector (RF2) and the ground plane.

The antenna module offers many advantages over conventional solutions. For example, the antenna module is a modularized, easy to fabricate, light-weight, planar ultra-wideband antenna module having reduced cost and weight. The antenna module includes PCBs that have only one dielectric layer and at most only two metallization layers. The coincident phase center of the polarization-diverse radiating antenna elements of the antenna module are fed by "egg-crate" arranged microstrip feed PCBs that provide mechanical support to the antenna elements and also reduce weight. The microstrip feed PCBs are soldered to a light-weight copper laminate ground plane.

Figure 8:
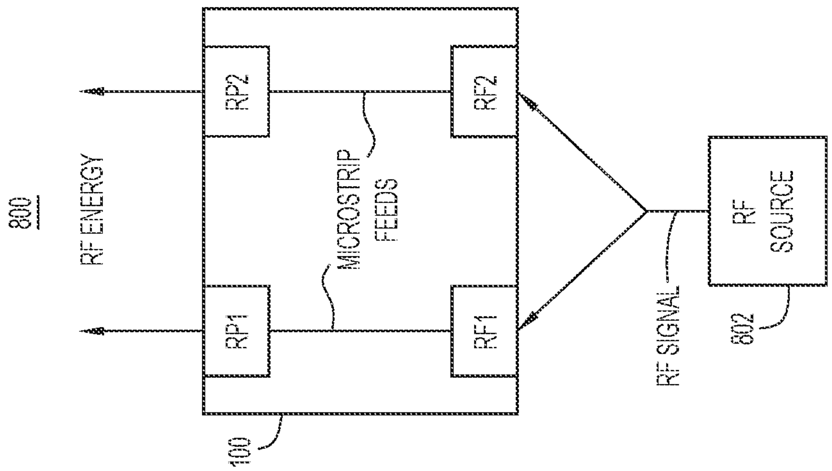
FIG. 8 is a block diagram of an example system that employs the antenna module as a transmit antenna.

FIG. 8 is a block diagram of a system 800 that employs antenna module 100 as a transmit antenna. System 800 includes an RF source 802 to supply an RF signal concurrently to RF connectors RF1, RF2 of antenna module 100. RF connectors RF1, RF2 concurrently feed the RF signal to orthogonal, crisscrossed, radiator pairs RP1, RP2 through the microstrip feeds of PCBs 108, 110, respectively. Radiator pairs RP1, RP2 have a coincident phase center. Radiator pairs RP1, RP2 are orthogonally polarized and thus form/generate orthogonal transmit beam patterns. For example, radiators pairs RP1 and RP2 form horizontally polarized and vertically polarized transmit beam patterns (and beams).

Figure 9:
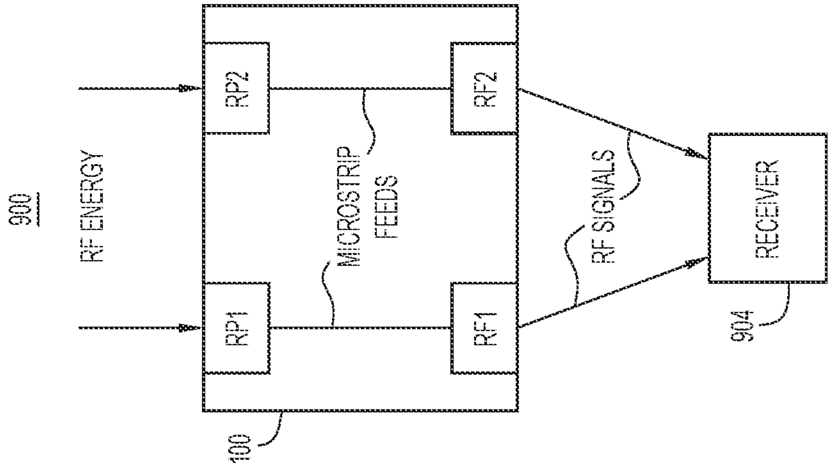
FIG. 9 is a block diagram of an example system that employs the antenna module as a receive antenna.

FIG. 9 is a block diagram of a system 900 that employs antenna module 100 as a receive antenna. In this case, orthogonal, crisscrossed, radiator pairs RP1, RP2 of antenna module 100 concurrently feed RF energy received by the radiator pairs to RF connectors RF1, RF2 through microstrip feeds on PCBs 108, 110, respectively. Radiator pairs RP1, RP2 form orthogonal receive beam patterns. For example, radiators pairs RP1 and RP2 form horizontally polarized and vertically polarized receive beam patterns. RF connectors RF1, RF2 feed the RF energy to a receiver 904.

Figure 10:
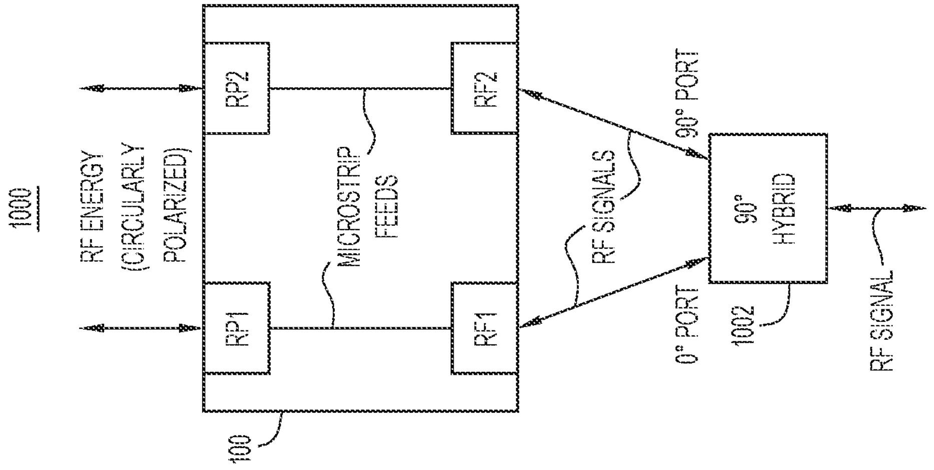
FIG. 10 is a block diagram of an example system that employs the antenna module as a circularly polarized receive/transmit antenna.

FIG. 10 is a block diagram of a system 1000 that employs antenna module 100 as a circularly polarized receive/transmit antenna. System 1000 includes a 90° hybrid coupler 1002 with a 0° phase port coupled to RF connector RF1 and a 90° port coupled to RF connector RF2. In a transmit direction, antenna module 100 forms a circularly polarized transmit beam pattern from the RF signal as applied to the antenna module through 90° hybrid coupler 1002. In a receive direction, antenna module 100 reduces received circularly polarized RF energy to the RF signal as applied through 90° hybrid coupler 1002.

Figure 11:
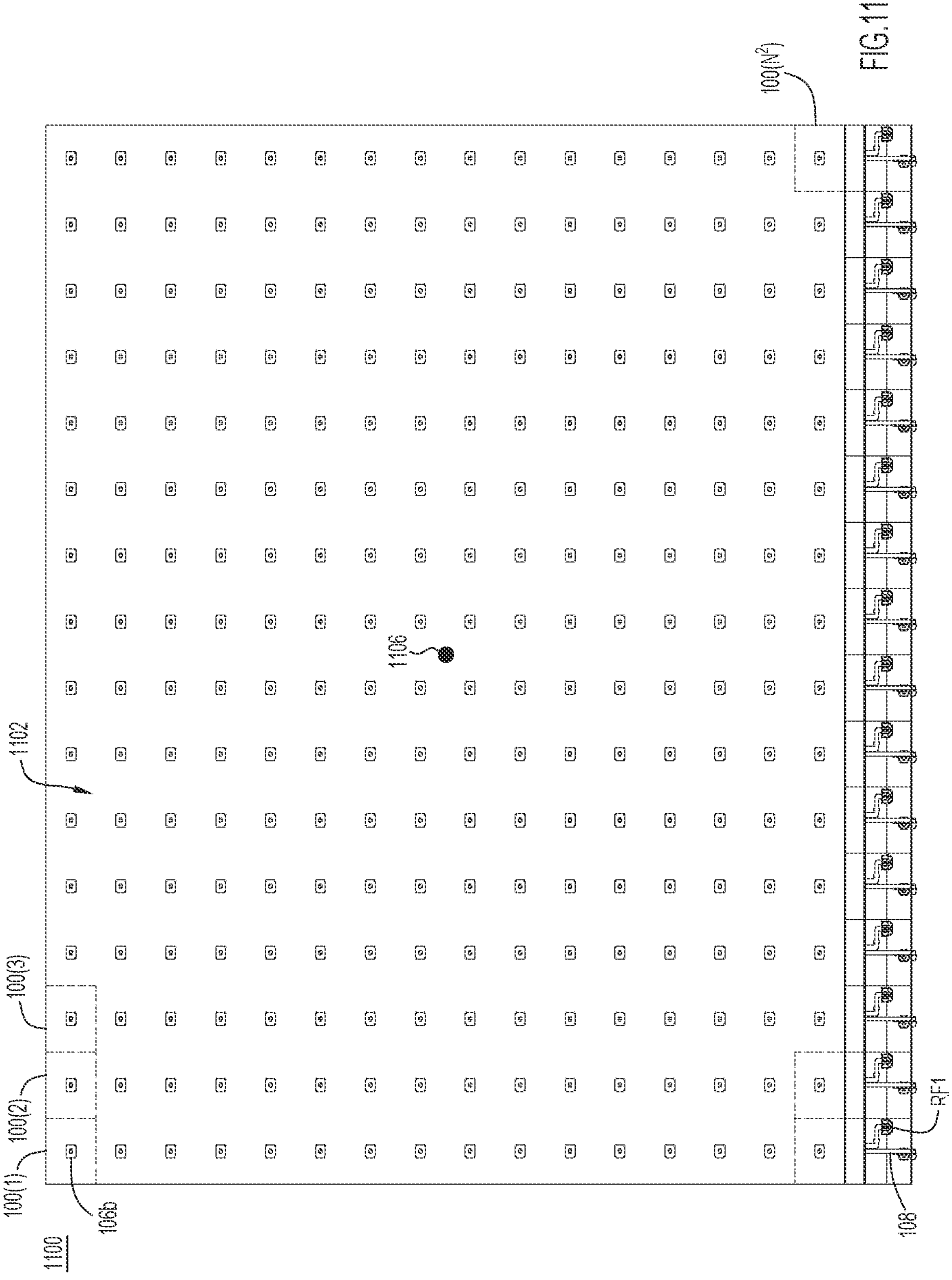
FIG. 11 is a perspective top view of an example antenna array formed using replicas of the antenna module.

The regular rectangular or cubic shape of antenna module 100 lends itself to combining multiple replicas of antenna module 100 (i.e., multiple PUMA modules) contiguously side-by-side into a large planar antenna array. That is, antenna module 100 may be used as a building block to construct the large planar antenna array or "tile," as shown in FIG. 11. FIG. 11 is a perspective top view of a planar N×N antenna array 1100 formed from multiple replicas (denoted 100(1)-100($N^2$)) of antenna module 100. That is, antenna array 1100 is formed as a matrix of the antenna modules that includes N rows and N columns of the antenna modules, which produces a square (planar) antenna array tile. In the example of FIG. 11, N=16; however, it is understood that N may be larger or smaller than 16. Moreover, the number of rows and columns may differ to produce a rectangular antenna array. Each antenna module is fixed to all adjacent or immediately surrounding neighbor antenna modules to form a planar top surface 1102 of contiguous PCBs 106 of the antenna modules and a planar bottom surface (not shown) of contiguous PCBs 102 of the antenna modules. For example, each antenna module may be epoxied to each of its neighbor antenna modules along faces of foam spacer 112 and the edges of the stacked PCBs and the support PCBs. Antenna array 1100 has a combined coincident phase center at a center 1106 of the antenna array. Antenna module replicas 100(1)-100($N^2$) produce combined horizontally polarized and vertically polarized antenna beam patterns. Alternatively, 90° hybrid couplers may be employed to cause antenna module replicas 100(1)-100($N^2$) to produce a circularly polarized antenna beam pattern. In a transmit direction, replicas 100(1)-100($N^2$) are concurrently driven with respective RF signals through their respective RF connector pairs (RF1, RF2). When there is zero phase offset across the RF signals, antenna array 1100 forms H-Pol and V-Pol antenna beam patters aligned with (i.e., with maximum gain along) center 1106. In a receive direction, replicas 100(1)-100($N^2$) are concurrently excited by receive RF at the antenna elements AE of the replicas, and feed the excitation to their respective RF connector pairs (RF1, RF2).

Figure 12:
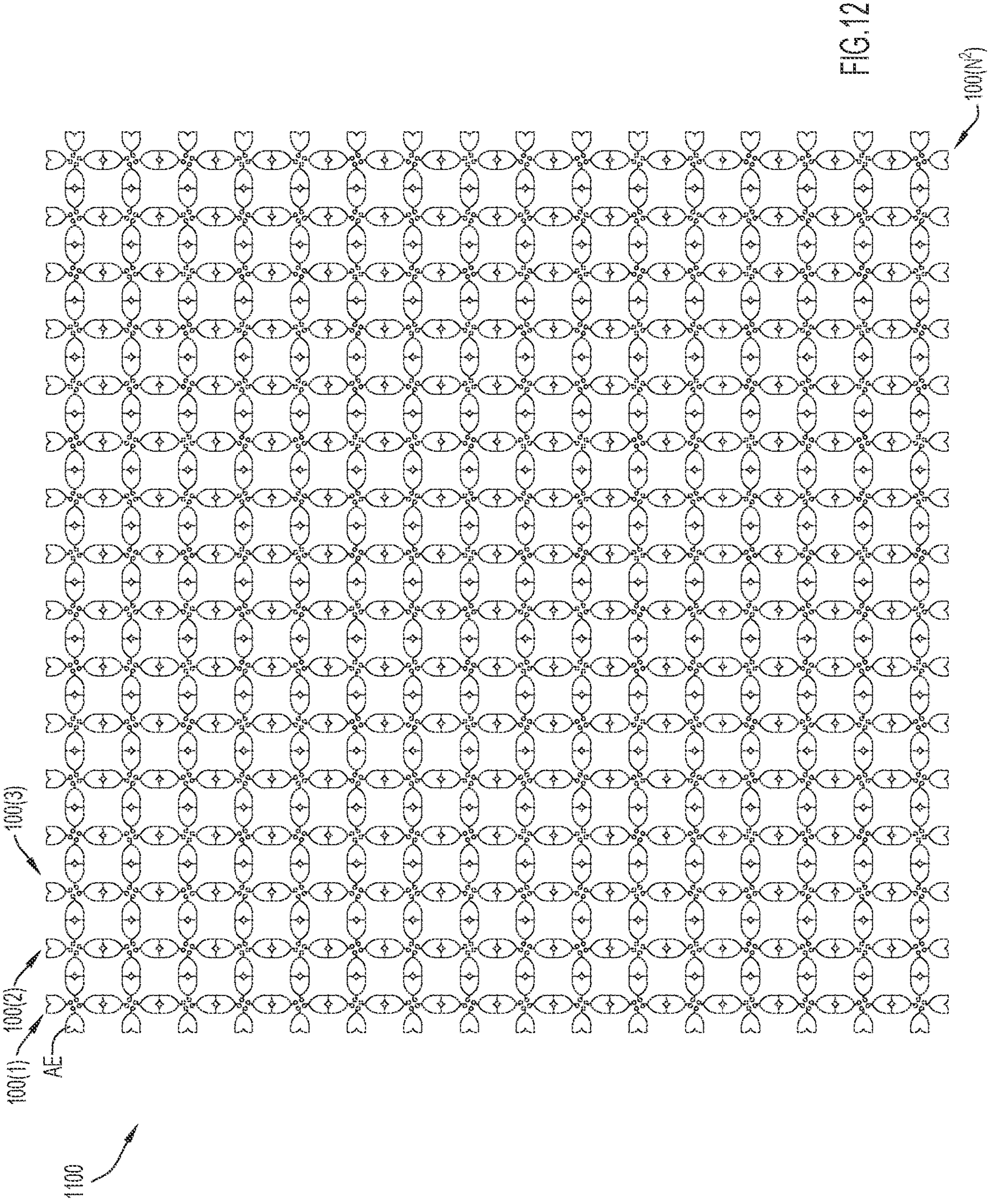
FIG. 12 is a top view of the antenna array modified to show the antenna elements of the replicas of the antenna modules.

FIG. 12 is a top view of antenna array 1100 modified to reveal the $N^2$ antenna elements AE of replicas 100(1)-100($N^2$). Each instance of antenna elements AE is immediately adjacent to its neighboring antenna elements.

Figure 13:
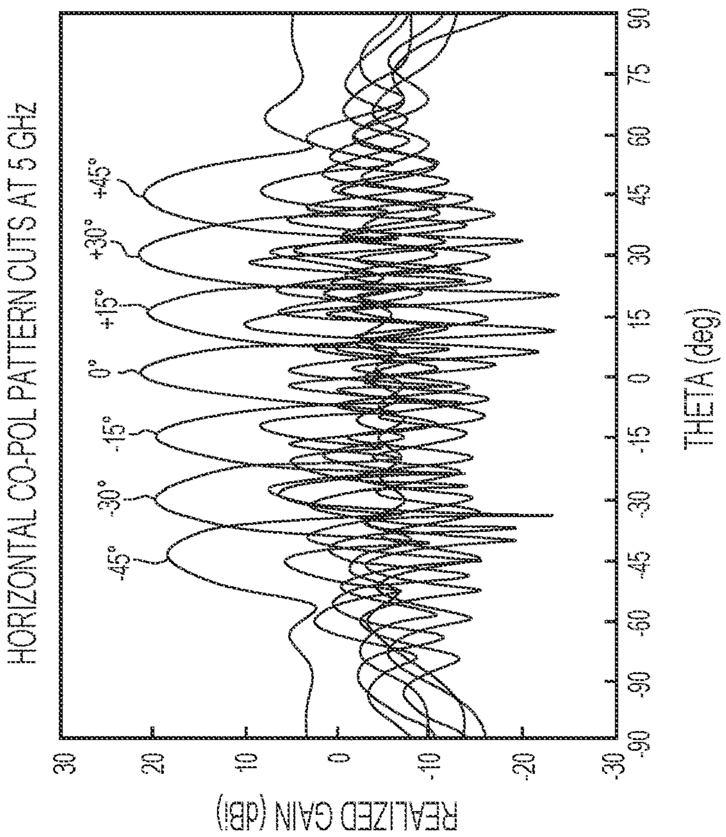
FIG. 13 is example horizontal coincident polarization antenna beam patterns for the antenna array.

FIG. 13 is an example horizontal coincident polarization antenna beam patterns for antenna array 1100 at 5 GHz. The antenna beam patterns show relatively constant gain across scan angles of 0°, +/−15°, +/−30°, and +/−45°.

Figure 14:
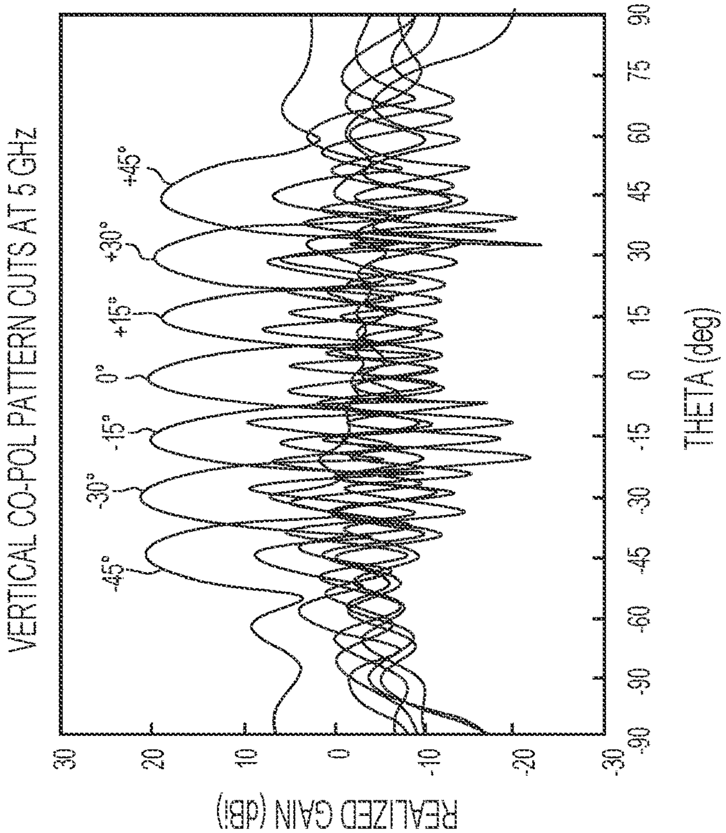
FIG. 14 is example vertical coincident polarization antenna beam patterns for the antenna array.

FIG. 14 is an example vertical coincident polarization antenna beam patterns for antenna array 1100 at 5 GHz. The antenna beam patterns show relatively constant gain across scan angles of 0°, +/−15°, +/−30°, and +/−45°.

As used herein, terms such as first and second, left and right, and upper and lower, are relative and may be used in place of each other. For example, first and left (or right) may be used interchangeably, second and right (or left) may be used interchangeably, first and upper (or lower) may be used interchangeably, and second and lower (or upper) may be used interchangeably. Also, the terms horizontal and vertical are used to denote orthogonal directions and may be replaced with terms such as transverse, perpendicular, and the like. As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

In summary, in some aspects, the techniques described herein relate to an antenna module including: stacked printed circuit boards (PCBs) (stacked PCBs) centered on an axis and including: a first PCB having a ground plane; a second PCB, spaced above the first PCB, having a first radiator pair and a second radiator pair that face the ground plane and orthogonally crisscross each other at the axis, each radiator pair having respective signal and ground connection pads adjacent to the axis to form a coincident phase center at the axis for each radiator pair; a third PCB, spaced above the second PCB, for impedance matching; and signal connectors extending through the first PCB; and support PCBs extending from the ground plane to the second PCB, the support PCBs having microstrip feeds to connect the respective signal and ground connection pads of the first radiator pair and the second radiator pair to the signal connectors and to the ground plane.

In some aspects, the techniques described herein relate to an antenna module, wherein: the stacked PCBs include planar PCBs that are stacked vertically along the axis, which is a vertical axis; and the support PCBs include planar support PCBs that extend vertically from the ground plane to the second PCB.

In some aspects, the techniques described herein relate to an antenna module, further including: a foam spacer sandwiched between the second PCB and the third PCB.

In some aspects, the techniques described herein relate to an antenna module, wherein: the stacked PCBs are all single-layer PCBs having metallization on only one side.

In some aspects, the techniques described herein relate to an antenna module, wherein: the support PCBs are all two-layer PCBs having metallization on opposing sides of each support PCB.

In some aspects, the techniques described herein relate to an antenna module, wherein: the stacked PCBs have rectangular shapes that are coextensive.

In some aspects, the techniques described herein relate to an antenna module, wherein: the signal connectors include first and second signal connectors; and each support PCB includes respective signal and ground microstrip feeds to connect respective ones of the respective signal and ground connection pads of each radiator pair to a respective one of the first and second signal connectors and to the ground plane.

In some aspects, the techniques described herein relate to an antenna module, wherein: each support PCB includes a two-layer PCB having the respective signal and ground microstrip feeds on opposing sides of the two-layer PCB.

In some aspects, the techniques described herein relate to an antenna module, wherein: a ground microstrip feed of the respective signal and ground microstrip feed includes a ground pad soldered to the ground plane and a ground leg that extends from the ground pad to a ground connection pad of the respective signal and ground connection pads.

In some aspects, the techniques described herein relate to an antenna module, wherein: the support PCBs crisscross each other along the axis.

In some aspects, the techniques described herein relate to an antenna module, wherein: the support PCBs have complementary interlocking slots that extend along the axis where the support PCBs crisscross each other.

In some aspects, the techniques described herein relate to an antenna module, wherein: the first radiator pair includes opposing first radiators respectively having first signal and ground connection pads; the second radiator pair includes opposing second radiators respectively having second signal and ground connection pads; the signal connectors include a first signal connector and a second signal connector; and the support PCBs include: a first support PCB having first signal and ground microstrip feeds to connect the first signal and ground connection pads to the first signal connector and the ground plane; and a second support PCB having second signal and ground microstrip feeds to connect the second signal and ground connection pads to the second signal connector and the ground plane.

In some aspects, the techniques described herein relate to an antenna module, wherein: the first support PCB is a first two-layer PCB having the first signal and ground microstrip feeds on opposing sides of the first two-layer PCB; and the second support PCB is a second two-layer PCB having the second signal and ground microstrip feeds on opposing sides of the second two-layer PCB.

In some aspects, the techniques described herein relate to an antenna array including: multiple antenna modules arrange in a matrix having N rows and M columns of the multiple antenna modules, wherein each antenna module includes: stacked printed circuit boards (PCBs) (stacked PCBs) centered on an axis and including: a first PCB having a ground plane; a second PCB, spaced above the first PCB, having a first radiator pair and a second radiator pair that face the ground plane and orthogonally crisscross each other at the axis, each radiator pair having respective signal and ground connection pads adjacent to the axis to form a coincident phase center at the axis for each radiator pair; a third PCB, spaced above the second PCB, for impedance matching; and signal connectors extending through the first PCB; and support PCBs extending from the ground plane to the second PCB, the support PCBs having microstrip feeds to connect the respective signal and ground connection pads of the first radiator pair and the second radiator pair to the signal connectors and to the ground plane.

In some aspects, the techniques described herein relate to an antenna array, further including: a foam spacer sandwiched between the second PCB and the third PCB.

In some aspects, the techniques described herein relate to an antenna array, wherein: the stacked PCBs are all single-layer PCBs having metallization on only one side.

In some aspects, the techniques described herein relate to an antenna array, wherein: the support PCBs are all two-layer PCBs having metallization on opposing sides of each support PCB.

In some aspects, the techniques described herein relate to an antenna array, wherein: the stacked PCBs have rectangular shapes that are coextensive.

In some aspects, the techniques described herein relate to an antenna array, wherein: the signal connectors include first and second signal connectors; and each support PCB includes respective signal and ground microstrip feeds to connect respective ones of the respective signal and ground connection pads of each radiator pair to a respective one of the first and second signal connectors and to the ground plane.

In some aspects, the techniques described herein relate to an antenna array, wherein: each support PCB includes a two-layer PCB having the respective signal and ground microstrip feeds on opposing sides of the two-layer PCB.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An antenna module comprising:

stacked printed circuit boards (PCBs) (stacked PCBs) centered on an axis and including:

a first PCB having a ground plane;

a second PCB, spaced above the first PCB, having a first radiator pair and a second radiator pair that face the ground plane and orthogonally crisscross each other at the axis, each radiator pair having respective signal and ground connection pads adjacent to the axis to form a coincident phase center at the axis for each radiator pair;

a third PCB, spaced above the second PCB, for impedance matching; and signal connectors extending through the first PCB; and support PCBs extending from the ground plane to the second PCB, the support PCBs having microstrip feeds to connect the respective signal and ground connection pads of the first radiator pair and the second radiator pair to the signal connectors and to the ground plane.

2. The antenna module of claim 1, wherein:

the stacked PCBs include planar PCBs that are stacked vertically along the axis, which is a vertical axis; and the support PCBs include planar support PCBs that extend vertically from the ground plane to the second PCB.

3. The antenna module of claim 1, further comprising:

a foam spacer sandwiched between the second PCB and the third PCB.

4. The antenna module of claim 1, wherein:

the stacked PCBs are all single-layer PCBs having metallization on only one side.

5. The antenna module of claim 1, wherein:

the support PCBs are all two-layer PCBs having metallization on opposing sides of each support PCB.

6. The antenna module of claim 1, wherein:

the stacked PCBs have rectangular shapes that are coextensive.

7. The antenna module of claim 1, wherein:

the signal connectors include first and second signal connectors; and each support PCB includes respective signal and ground microstrip feeds to connect respective ones of the respective signal and ground connection pads of each radiator pair to a respective one of the first and second signal connectors and to the ground plane.

8. The antenna module of claim 7, wherein:

each support PCB includes a two-layer PCB having the respective signal and ground microstrip feeds on opposing sides of the two-layer PCB.

9. The antenna module of claim 8, wherein:

a ground microstrip feed of the respective signal and ground microstrip feed includes a ground pad soldered to the ground plane and a ground leg that extends from the ground pad to a ground connection pad of the respective signal and ground connection pads.

10. The antenna module of claim 1, wherein:

the support PCBs crisscross each other along the axis.

11. The antenna module of claim 10, wherein:

the support PCBs have complementary interlocking slots that extend along the axis where the support PCBs crisscross each other.

12. The antenna module of claim 1, wherein:

the first radiator pair includes opposing first radiators respectively having first signal and ground connection pads;

the second radiator pair includes opposing second radiators respectively having second signal and ground connection pads;

the signal connectors include a first signal connector and a second signal connector; and the support PCBs include:

a first support PCB having first signal and ground microstrip feeds to connect the first signal and ground connection pads to the first signal connector and the ground plane; and a second support PCB having second signal and ground microstrip feeds to connect the second signal and ground connection pads to the second signal connector and the ground plane.

13. The antenna module of claim 12, wherein:

the first support PCB is a first two-layer PCB having the first signal and ground microstrip feeds on opposing sides of the first two-layer PCB; and the second support PCB is a second two-layer PCB having the second signal and ground microstrip feeds on opposing sides of the second two-layer PCB.

14. An antenna array comprising:

multiple antenna modules arrange in a matrix having N rows and M columns of the multiple antenna modules, wherein each antenna module includes:

stacked printed circuit boards (PCBs) (stacked PCBs) centered on an axis and including:

a first PCB having a ground plane;

a second PCB, spaced above the first PCB, having a first radiator pair and a second radiator pair that face the ground plane and orthogonally crisscross each other at the axis, each radiator pair having respective signal and ground connection pads adjacent to the axis to form a coincident phase center at the axis for each radiator pair;

a third PCB, spaced above the second PCB, for impedance matching; and signal connectors extending through the first PCB; and support PCBs extending from the ground plane to the second PCB, the support PCBs having microstrip feeds to connect the respective signal and ground connection pads of the first radiator pair and the second radiator pair to the signal connectors and to the ground plane.

15. The antenna array of claim 14, further comprising:

a foam spacer sandwiched between the second PCB and the third PCB.

16. The antenna array of claim 14, wherein:

the stacked PCBs are all single-layer PCBs having metallization on only one side.

17. The antenna array of claim 14, wherein:

the support PCBs are all two-layer PCBs having metallization on opposing sides of each support PCB.

18. The antenna array of claim 14, wherein:

the stacked PCBs have rectangular shapes that are coextensive.

19. The antenna array of claim 14, wherein:

the signal connectors include first and second signal connectors; and each support PCB includes respective signal and ground microstrip feeds to connect respective ones of the respective signal and ground connection pads of each radiator pair to a respective one of the first and second signal connectors and to the ground plane.

20. The antenna array of claim 19, wherein:

each support PCB includes a two-layer PCB having the respective signal and ground microstrip feeds on opposing sides of the two-layer PCB.

* * * * *